(12) United States Patent
Doering et al.

(10) Patent No.: US 9,243,600 B2
(45) Date of Patent: Jan. 26, 2016

(54) METHOD AND SYSTEM FOR IMPROVING AUTOMATIC ENGINE STOPPING

(75) Inventors: Jeffrey Allen Doering, Canton, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 677 days.

(21) Appl. No.: 13/603,212

(22) Filed: Sep. 4, 2012

(65) Prior Publication Data
US 2014/0067239 A1   Mar. 6, 2014

(51) Int. Cl.
| | | |
|---|---|---|
| *F02D 17/02* | (2006.01) | |
| *F02D 17/04* | (2006.01) | |
| *F02N 11/08* | (2006.01) | |
| *F02D 41/14* | (2006.01) | |

(52) U.S. Cl.
CPC ........ *F02N 11/0822* (2013.01); *F02D 41/1406* (2013.01); *F02N 2200/10* (2013.01); *F02N 2200/102* (2013.01); *F02N 2200/105* (2013.01); *F02N 2300/2004* (2013.01); *F02N 2300/2011* (2013.01); *Y02T 10/48* (2013.01)

(58) Field of Classification Search
CPC .......... F02B 77/00; F02B 77/11; F02D 17/02; F02D 41/0087; Y02T 10/18
USPC ............ 123/481, 198 F, 179.4; 701/112, 105, 701/113
See application file for complete search history.

(56) References Cited

U.S. PATENT DOCUMENTS

| | | | |
|---|---|---|---|
| 4,774,858 A | 10/1988 | Ganoung | |
| 4,964,318 A | 10/1990 | Ganoung | |
| 7,481,194 B2* | 1/2009 | Celisse et al. | 123/179.4 |
| 7,555,896 B2 | 7/2009 | Lewis et al. | |
| 7,699,034 B2* | 4/2010 | Abendroth et al. | 123/179.4 |
| 8,548,715 B2* | 10/2013 | Gallagher et al. | 701/102 |
| 8,660,775 B2* | 2/2014 | Baumann et al. | 701/112 |
| 2002/0033157 A1* | 3/2002 | Thompson et al. | 123/179.4 |
| 2003/0041830 A1* | 3/2003 | Sugiura et al. | 123/179.4 |
| 2004/0089258 A1* | 5/2004 | Buglione et al. | 123/179.4 |
| 2007/0245997 A1* | 10/2007 | Levasseur et al. | 123/179.4 |
| 2011/0066359 A1* | 3/2011 | Lin et al. | 701/112 |
| 2013/0238225 A1* | 9/2013 | Morita | 701/112 |
| 2014/0309912 A1* | 10/2014 | Hirano et al. | 701/112 |

FOREIGN PATENT DOCUMENTS

WO   2012008913 A2   1/2012

* cited by examiner

*Primary Examiner* — Hai Huynh
*Assistant Examiner* — Raza Najmuddin
(74) *Attorney, Agent, or Firm* — Julia Voutyras; Alleman Hall McCoy Russell & Tuttle LLP (57) ABSTRACT

A method and system for improving automatic engine stopping and starting is presented. In one example, the method adjusts conditions for engine stopping in response to operating conditions that are evaluated according to one or more cost functions. The method may improve vehicle fuel economy and limit driver annoyances.

20 Claims, 7 Drawing Sheets

METHOD AND SYSTEM FOR IMPROVING AUTOMATIC ENGINE STOPPING

FIELD

The present description relates to a system for improving automatic stopping and starting of an engine. The method may be particularly useful for improving vehicle fuel economy and driving experience.

BACKGROUND AND SUMMARY

An engine can be automatically stopped to conserve fuel. A controller may judge to stop an engine based on a combination of monitored vehicle operating conditions. For example, an engine may be stopped when vehicle speed is zero and while a driver is depressing a vehicle brake actuator. Stopping the engine during such conditions may conserve fuel. However, the driver may also release the vehicle brake shortly after the engine is stopped such that little if any fuel may be conserved. Additionally, the short engine stop may be an annoyance to the driver. On the other hand, if the engine is allowed to idle for an extended amount of time before the engine is stopped, only a small amount of fuel may be conserved by stopping the engine. Consequently, it may be a challenge to realize significant fuel saving for some drivers and some driving conditions.

The inventors herein have recognized the above-mentioned disadvantages and have developed a method for operating an engine, comprising: automatically stopping an engine in response to one or more vehicle operating conditions meeting engine stopping criteria; and adjusting the engine stopping criteria in response to engine stopping conditions being evaluated via one or more cost functions.

By adjusting engine stopping criteria in response to weighing engine stopping conditions against one or more cost functions, it may be possible to improve vehicle fuel efficiency while limiting driver annoyance. For example, if a driver exhibits a characteristic of releasing vehicle brakes shortly after stopping a vehicle to allow the vehicle to creep, it may be desirable to increase an engine idle time after a vehicle stop to reduce the possibility of stopping the engine while the driver releases the brake. On the other hand, if the driver routinely waits several minutes before requesting vehicle acceleration after vehicle stop, it may be desirable to stop the engine just when the vehicle stops so that more fuel may be conserved.

The present description may provide several advantages. Specifically, the approach may improve vehicle fuel efficiency of an automatically stopped and started vehicle for a larger group of drivers. Additionally, the approach may reduce driver annoyance by stopping an engine when a driver expects the engine to be stopped. Further, the method may improve engine stopping and starting consistency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1:
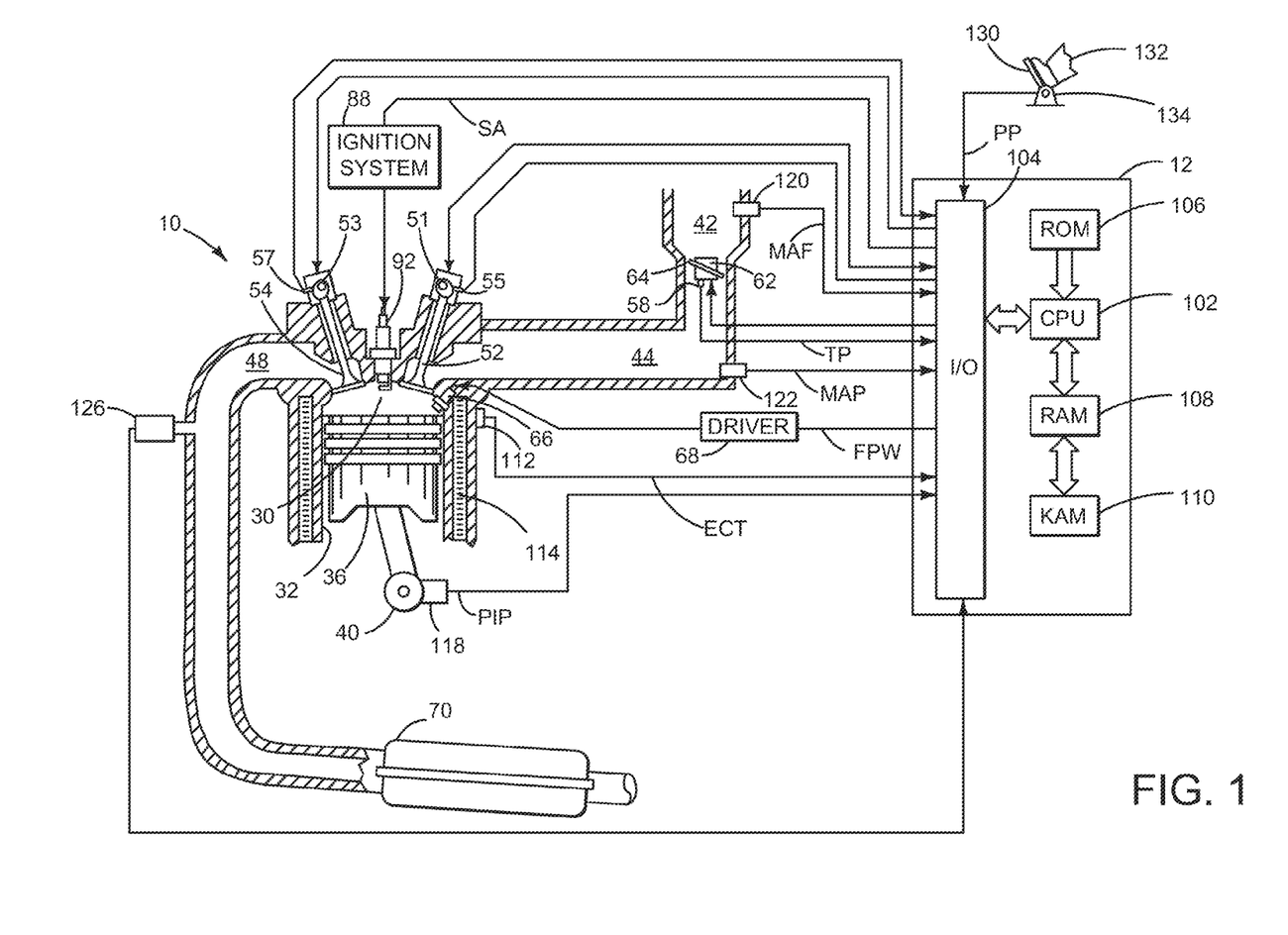
FIG. 1 is a schematic diagram of an engine.
Figure 2:
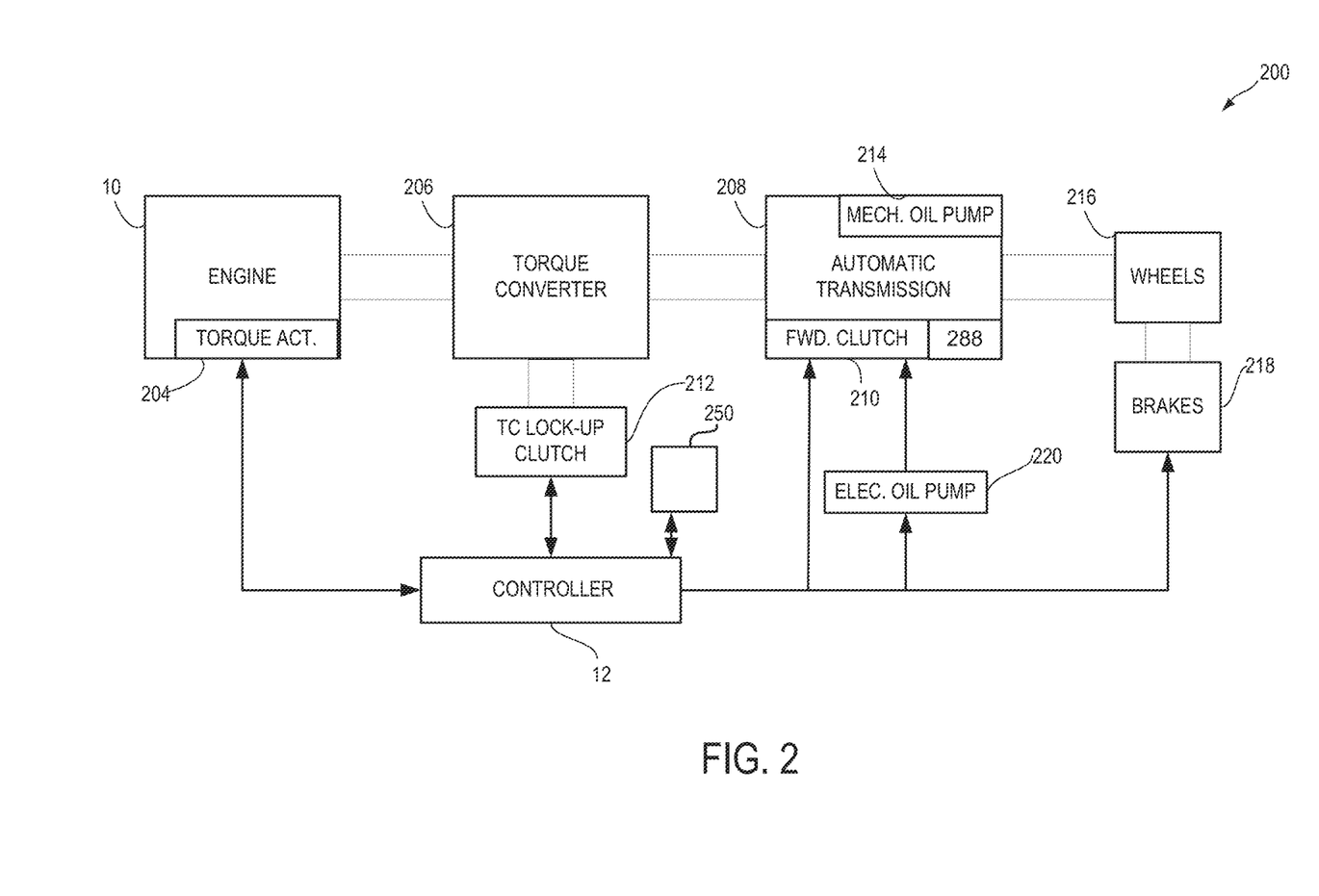
FIG. 2 is shows an example vehicle system layout.
Figure 3:
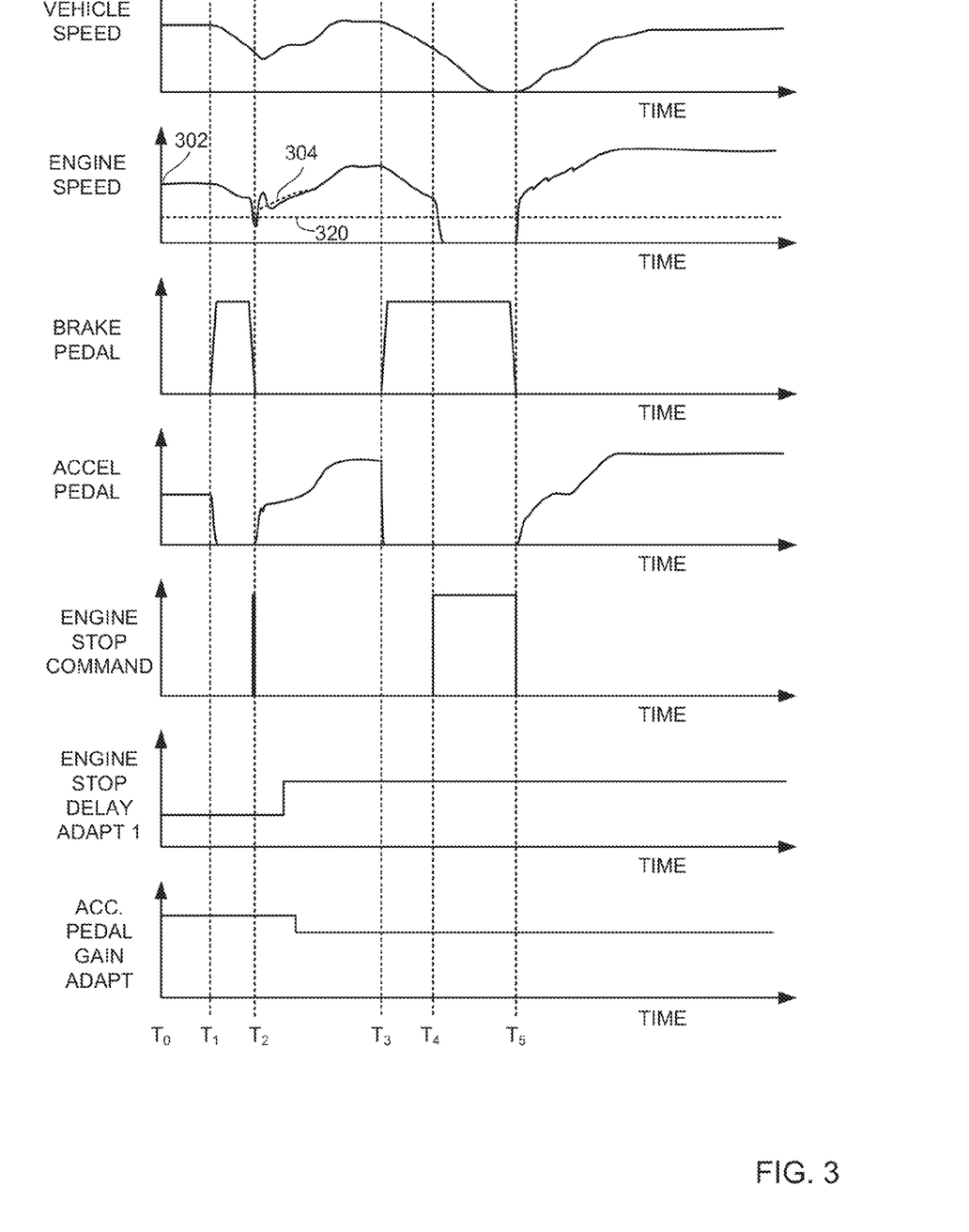
FIG. 3 is an example prophetic plot of signals of interest during a simulated engine stop and restart.
Figure 4:
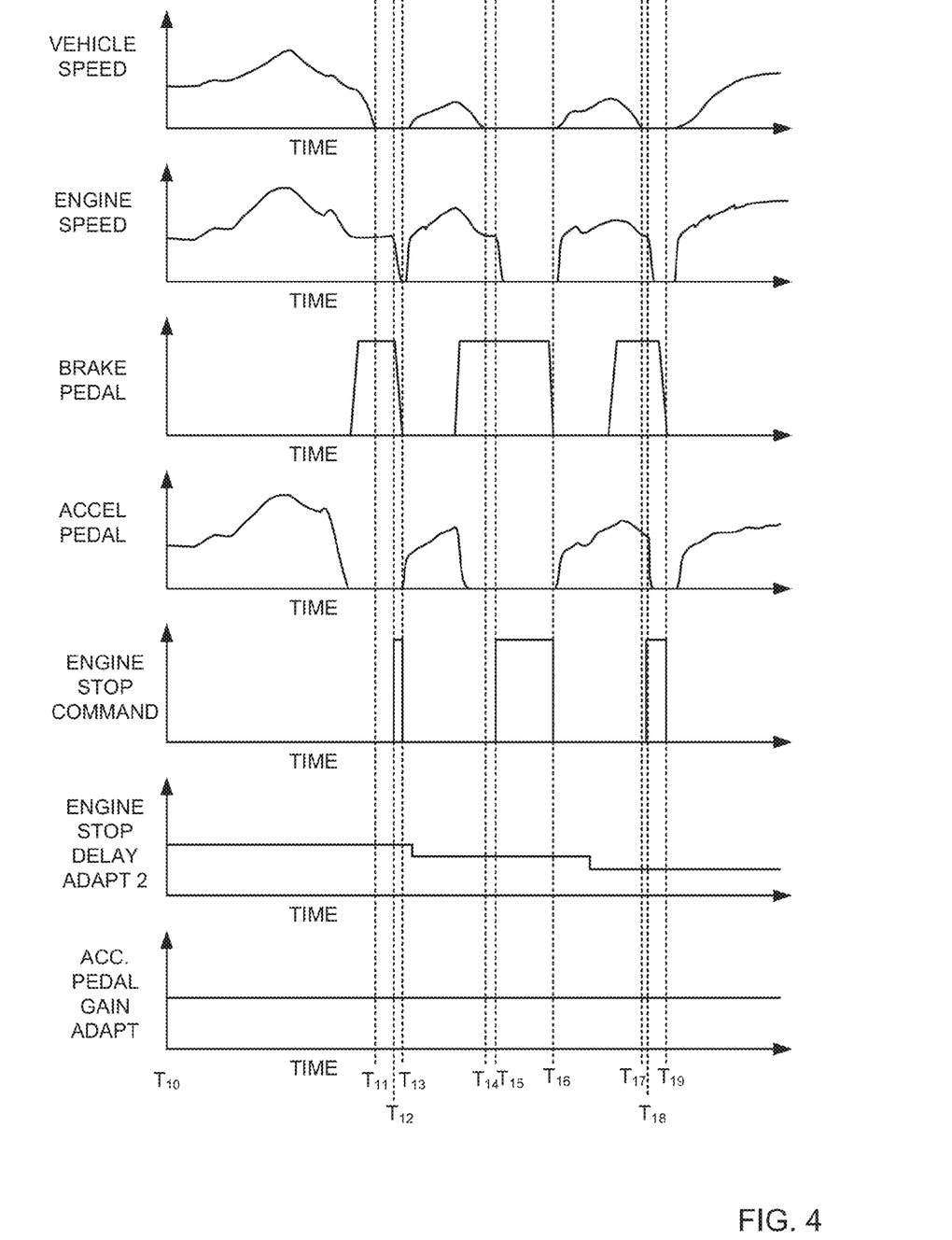
FIG. 4 is another example prophetic plot of signals of interest during a simulated engine stop and start sequence.
Figure 5A:
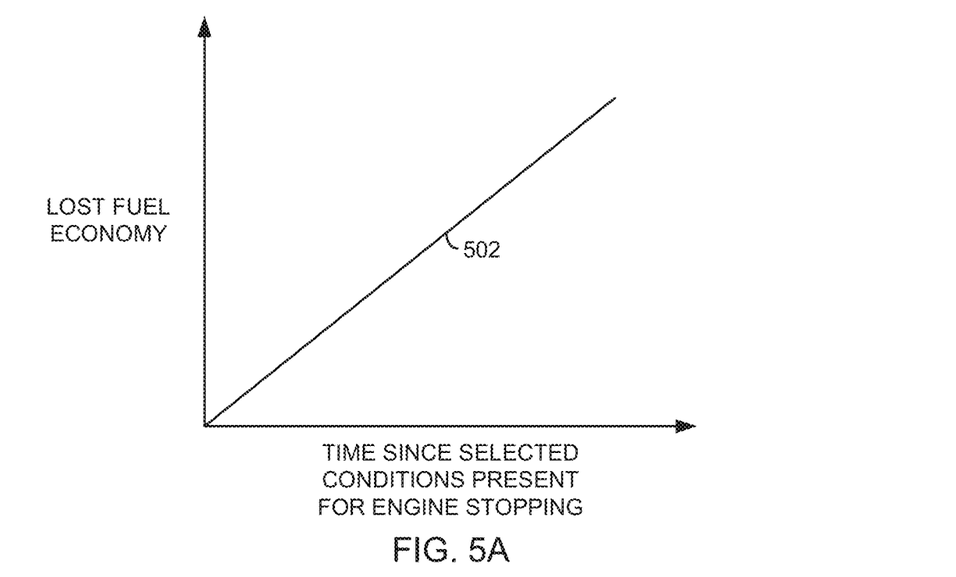
FIGS. 5A and 5B show example cost functions used after stopping an engine.
Figure 5B:
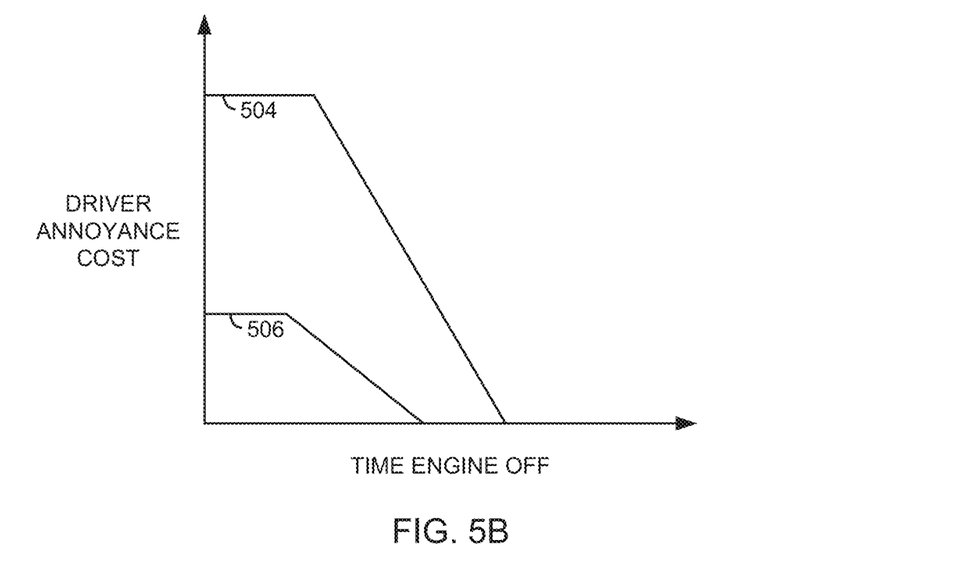
Figure 6:
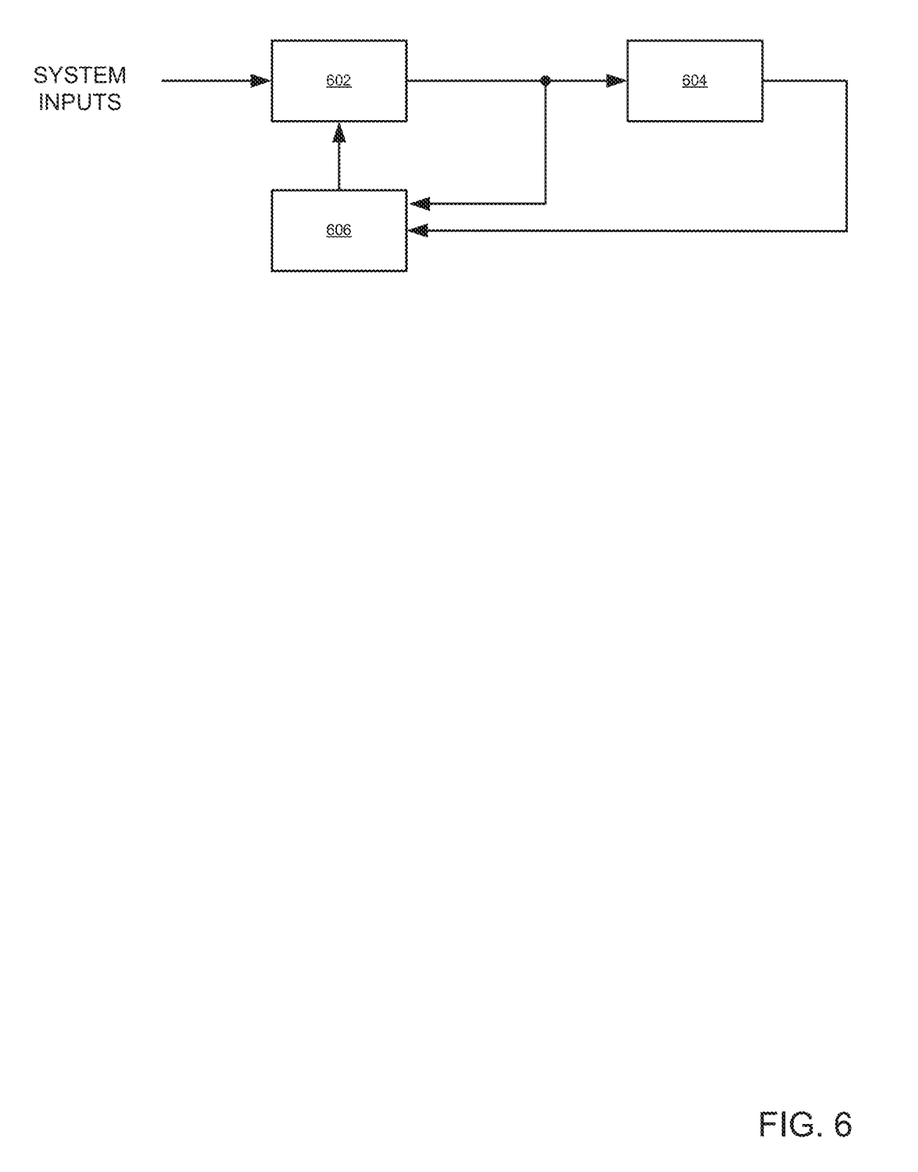
FIG. 6 is a block diagram an example system for stopping and starting a vehicle engine.

The present description is related to automatically stopping and starting an engine. In one non-limiting example, the engine may be configured as illustrated in FIG. 1. Further, the engine may be part of a vehicle as illustrated in FIG. 2. Engine stopping and starting may be performed according to the method described in FIG. 7. FIG. 6 shows one example block diagram for stopping an engine, and FIGS. 5A and 5B show example cost functions that may be included in a system for automatically stopping an engine. Finally, FIGS. 3 and 4 show example vehicle operating sequences according to the method shown in FIG. 7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO)

sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 200. Vehicle 200 may be powered by engine 10. Engine 10 may be started with an engine starting system (not shown). Further, toque of engine 10 may be adjusted via torque actuator 204, such as a fuel injector, throttle, etc.

An engine output torque may be transmitted to torque converter 206 to drive an automatic transmission 208. Further, one or more clutches may be engaged, including forward clutch 210, to propel a vehicle. In one example, the torque converter may be referred to as a component of the transmission. Further, transmission 208 may include a plurality of gear clutches (e.g., gears 1-6) 288 that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle. Specifically, automatic transmission 208 may transfer an input driving torque at the input shaft (not shown) responsive to a vehicle traveling condition before transmitting an output driving torque to the wheels.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

A controller 12 may be configured to receive inputs from engine 10 and driver input device 250, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. The driver input device may comprise an interactive display panel, switches, and other known input devices.

When idle-stop conditions are satisfied, controller 42 may initiate engine shutdown by shutting off fuel and spark to the engine. Further, to maintain an amount of torsion in the transmission, the controller may ground rotating elements of transmission 208 to a case of the transmission and thereby to the frame of the vehicle.

When engine restart conditions are satisfied, and/or a vehicle operator wants to launch the vehicle, controller 12 may reactivate the engine by resuming combustion in engine cylinders. Transmission 208 may be unlocked and the wheel brakes 218 may be released, to return torque to the driving wheels 216. A transmission clutch pressure may be adjusted to unlock the transmission, while a wheel brake pressure may be adjusted to coordinate the release of the brakes with the unlocking of the transmission, and a launch of the vehicle.

The system of FIGS. 1 and 2 provides for operating an engine, comprising: an engine; and a controller including non-transitory instructions to automatically stop the engine in response to one or more vehicle operating conditions meeting engine stopping criteria, instructions for adjusting the engine stopping criteria in response to engine stopping conditions being evaluated via one or more cost functions, and instructions to adjust the one or more cost functions. The system includes where the one or more cost functions are adjusted in response to driver input. The system further comprises a driver input device for adjusting the one or more cost functions. The system further comprises additional instructions for adjusting an actuator transfer function applied during engine run-up to engine starting conditions being evaluated via an engine starting cost function. The system includes where the one or more cost functions weigh time an engine is stopped against driver annoyance.

Referring to FIG. 3, an example prophetic plot of signals of interest during a simulated engine stop and restart is shown. The sequence of FIG. 3 may be provided by executing instructions in the system of FIGS. 1 and 2 according to the method of FIG. 7. Vertical markers at times $T_0$-$T_5$ represent times of interest during the sequence. The sequence of FIG. 3 occurs where a relatively long period of time exists between engine stopping conditions. In this example, stopping of engine rotation is allowed while the vehicle is moving so as to improve fuel efficiency during periods where time between engine stop conditions is rather long.

The first plot from the top of FIG. 3 represents vehicle speed versus time. The Y axis represents vehicle speed and vehicle speed increases in the direction of the Y axis arrow. The X axis represents time and time increases from the left side of the plot to the right side of the plot.

The second plot from the top of FIG. 3 represents engine speed versus time. The Y axis represents engine speed and engine speed increases in the direction of the Y axis arrow. The X axis represents time and time increases from the left side of the plot to the right side of the plot. Horizontal line 320 represents a desired engine idle speed. Trace 302 represents actual engine speed and dotted line 304 represents desired engine speed. When only actual engine speed 302 is shown, desired engine speed 304 matches actual engine speed 302.

The third plot from the top of FIG. 3 represents brake pedal displacement versus time. The Y axis represents brake pedal position and the brake pedal is applied further in the direction of the Y axis arrow. The X axis represents time and time increases from the left side of the plot to the right side of the plot.

The fourth plot from the top of FIG. 3 represents accelerator pedal displacement versus time. The Y axis represents accelerator pedal position and accelerator pedal is applied further in the direction of the Y axis arrow. The X axis represents time and time increases from the left side of the plot to the right side of the plot.

The fifth plot from the top of FIG. 3 represents automatic engine stop command versus time. The Y axis represents automatic engine stop command and engine stop is commanded when the signal is at a higher level in the direction of the Y axis arrow. The X axis represents time and time increases from the left side of the plot to the right side of the plot.

The sixth plot from the top of FIG. 3 represents an amount of time to delay engine stopping after other selected engine stopping conditions have been met. In this example, the time delay is a delay for stopping engine rotation after engine stop conditions have been met while the vehicle is moving. The Y axis represents a value of an adapted engine stop delay time and engine stop delay time increases in the direction of the Y axis arrow. The X axis represents time and time increases from the left side of the plot to the right side of the plot.

The seventh plot from the top of FIG. 3 represents accelerator pedal transfer function gain for a time during engine speed run-up. Engine speed run-up may be interpreted as a time from engine stop until engine speed reaches a threshold speed (e.g., idle speed). The Y axis represents accelerator pedal gain and accelerator pedal gain increases in the direction of the Y axis arrow. The X axis represents time and time increases from the left side of the plot to the right side of the plot.

At time $T_0$, the vehicle is traveling at a middle level speed and the engine is rotating as indicated by engine speed being greater than zero. The brake pedal is not depressed and the accelerator pedal is at a middle level position and responding to driver commands. The automatic engine stop command is not asserted and the adapted engine stop delay and accelerator pedal gains are at fixed levels.

At time $T_1$, the accelerator pedal command decreases in response to a driver releasing the accelerator pedal. Engine speed and vehicle speed begin to decline in response to a reduced engine torque demand that is derived from the accelerator pedal demand. Shortly thereafter, the brake pedal is applied in response to a driver depressing a vehicle brake and vehicle deceleration is increased. The engine stop command is not asserted and the adapted engine stop delay and accelerator pedal gain remain at the same levels.

Between time $T_1$ and time $T_2$, engine speed is reduced since there is no accelerator input from the driver, and vehicle speed is reduced in response to application of vehicle brakes by the driver. Additionally, the engine stop command is issued just before time $T_2$. In this example, the engine stop command is issued in response to vehicle speed decreasing, time since accelerator pedal release being greater than a threshold amount of time, and brake pedal application. Spark and fuel delivery to the engine are stopped in response to the engine stop command being issued and engine speed decreases at an increased rate.

At time $T_2$, the driver releases the brake pedal as indicated by the brake pedal signal being reduced. The engine stop command state also changes from asserted to not asserted in response to the driver releasing the brake pedal. The engine is restarted by supplying fuel and spark to the engine. The driver also depresses the accelerator pedal at or shortly after time $T_2$ to indicate an intention to accelerate the vehicle. Actual engine speed 302 increases shortly after spark and fuel are supplied to the engine, and engine torque is increased in response to the applied accelerator pedal. In one example, a first accelerator pedal transfer function that relates accelerator pedal position to desired engine torque is the basis for increasing engine torque during engine run-up. The first accelerator pedal transfer function is multiplied by the adapted accelerator pedal gain in the seventh plot to adjust the desired engine torque. A second accelerator pedal transfer function is provided as a basis for determining engine torque after engine speed exceeds idle speed a first time after engine stop. The first and second accelerator pedal transfer functions allow different engine responses to driver accelerator pedal demands during different engine operating conditions. However, in some examples, only a single accelerator pedal transfer function may be provided. Engine fuel, spark, and air amount are also adjusted in response to the desired engine torque.

Shortly after time $T_2$, engine speed increases and spark and fuel are supplied to the engine in response to the desired engine torque increasing as a result of the accelerator pedal input being multiplied by the adapted accelerator pedal gain. The actual engine speed 302 accelerates above the desired engine speed 304. The driver also partially releases the accelerator to control engine speed, and as a result, actual engine speed 302 decreases to below desired engine speed 304. A comparison between desired engine speed 304 and actual engine speed is made during the engine run-up period and for a predetermined period of time thereafter. The comparison is processed through a cost function that relates a difference between desired and actual engine speeds to driver annoyance. The accelerator pedal gain is reduced shortly thereafter based on cost function output. In one example, the comparison between desired engine speed and actual engine speed outputs a magnitude value that represents an amount that actual engine speed exceeds desired engine speed. The comparison may also output an amount of time desire engine speed is exceeded. If actual engine speed is less than desired engine speed, the comparison outputs a greatest speed difference between actual and desired engine speed as well as an amount of time that the difference exists. The cost function then allows adjustment to the accelerator pedal gain based on comparison input to the cost function. In some examples, the revised accelerator pedal gain may apply only to a specific portion of the accelerator pedal transfer function (e.g., pedal inputs that are less than 10% of full scale pedal input). The accelerator pedal gain may be multiplied by the output of the cost function, or the cost function may allow adjustment of the accelerator pedal gain by another function or by a predefined increment/decrement.

Also after time $T_2$, time is measured from $T_1$ to $T_2$ to determine an amount of time the engine was commanded off. The amount of time engine was commanded off is input to a cost function that determines a driver annoyance level based in a time selected condition allow for engine stopping. The driver annoyance level cost function may be empirically determined via experimenting automatic engine starting and stopping on a variety of drivers. In this example, the amount of time the engine was commanded off is short. Consequently, the driver annoyance level is high. The adapted engine stop delay (e.g., the time between when selected engine conditions provide for engine stopping and the time when an engine stop command is issued) is therefore increased to allow more time before the engine stop command is issued during similar conditions. In one example, the engine stop delay increment/decrement may be adjusted a predetermined amount when output of the cost function indicates that the driver annoyance level is greater than a threshold amount. In other examples, the engine stop delay time may be multiplied by the output of the driver annoyance cost function to adjust or adapt the engine stop delay time. After the engine stop delay and the accelerator pedal gain are adapted, the vehicle speed increases and then begins to decrease at time $T_3$.

At time $T_3$, the driver once again releases the accelerator pedal and applies the vehicle brake shortly thereafter in response to road conditions. The vehicle speed begins to decrease since engine torque is decreased in response to no accelerator input and application of vehicle brakes. The engine stop command is not asserted and the engine stop delay and the accelerator pedal gain remain at constant values.

At time $T_4$, the engine stop command is issued and fuel and spark are withheld from the engine. The engine speed goes to zero shortly after time $T_4$ and vehicle speed continues to be reduced. Thus, engine rotation is automatically stopped while the vehicle continues to decelerate. The engine is automatically stopped without the driver requesting engine stop via a dedicated input that has a sole function of starting and/or stopping the engine (e.g., an ignition switch). The automatic engine stop is based on inputs other than the dedicated operator input for starting and/or stopping the engine. The brake pedal is also held in an applied state and the engine stop delay and the accelerator pedal gain remain at the same constant level.

Between time $T_4$ and time $T_5$, vehicle speed decreases to zero and the driver's foot remains on the brake pedal. The engine also remains stopped and fuel is conserved.

At time $T_5$, the driver releases the brake pedal and applies the accelerator pedal. The actual engine speed closely follows the desired engine speed and the vehicle begins to accelerate. The engine stop command is also withdrawn and not asserted after time $T_5$.

After time $T_5$, the accelerator pedal increases to a desired level and stays at that level for the remainder of the sequence. Additionally, the desired engine speed and actual engine speed are compared and the difference is applied to the cost function that relates the difference between desired and actual engine speed to driver annoyance. However, based on the engine and actual speeds at time $T_5$, the adapted accelerator pedal gain is not modified. Likewise, the amount of time the engine was commanded off is input to the cost function that determines a driver annoyance level based on the time selected conditions allow for engine stopping. Since the engine was stopped for a reasonable amount of time and since the engine stopping process was not interrupted, the engine stop delay time is not adjusted further.

Referring now to FIG. 4, an example prophetic plot of signals of interest during a simulated engine stop and restart is shown. The sequence of FIG. 4 may be provided by executing instructions in the system of FIGS. 1 and 2 according to the method of FIG. 7. Vertical markers at times $T_{10}$-$T_{19}$ represent times of interest during the sequence. The sequence of FIG. 4 occurs where a relatively short period of time exists between engine stopping conditions. In this example, stopping of engine rotation is not allowed while the vehicle is moving. This reduces the possibility of stopping the engine and restarting the engine without stopping the engine for a desired amount of time during periods where braking is short and repeated.

FIG. 4 shows seven plots that include similar variables as discussed with regard to FIG. 3. Therefore, for the sake of brevity, the description of variables that are identical is omitted. The sixth plot shows an adapted second engine stop delay that is applied during conditions where time between engine braking events is short and when the vehicle is stopped. In particular, the adapted second engine stop delay is a time delay from when the vehicle stops, accelerator pedal not depressed, and brake pedal applied to when the engine stop command is issued.

At time $T_{10}$, the accelerator pedal, engine speed, and vehicle speed are at middle levels. The brake is not applied and the engine stop command is not asserted. The adapted engine stop delay and the adapted accelerator pedal gain are at constant levels.

Between time $T_{10}$ and time $T_{11}$, the accelerator pedal position is increased and then decreases to zero as time approaches $T_{11}$ in response to driver demands that are based on road conditions. The vehicle brake is applied by the driver shortly after the accelerator pedal is released. Vehicle speed decreases in response to application of the vehicle brake and accelerator pedal release.

At time $T_{11}$, vehicle speed reaches zero and the engine is at idle speed. The brake pedal remains applied by the driver and the accelerator pedal is not applied. The engine stop command is not asserted and the adapted second engine stop delay and accelerator pedal gains remain at constant values. A timer is started in response to vehicle speed reaching zero and the timer continues to increase until the engine is to be restarted.

At time $T_{12}$, the engine stop command is asserted in response to the timer reaching a value of the adapted second engine stop delay. The supply of fuel and spark to the engine is ceased and engine rotational speed goes to zero. The vehicle speed remains at zero and the brake pedal continues to be applied. The adapted second engine stop delay and accelerator pedal gain remain at the same constant values.

At time $T_{13}$, the brake pedal is released by the driver and the engine is cranked over while being supplied with fuel and spark. The engine stop command is withdrawn and not asserted in response to the driver releasing the vehicle brake. The driver also applies the accelerator pedal and engine speed increases. Engine speed follows a desired trajectory and torque is transferred from the engine to vehicle wheels via a transmission.

Between time $T_{13}$ and time $T_{14}$, the amount of time the engine is at idle between time $T_{11}$ and time $T_{12}$ is input to a cost function that weighs engine idle time with lost fuel economy. In one example, the cost function outputs a multiplier that modifies the adapted engine stop delay time. In another example, the cost function permits a predetermined value to be added to or subtracted from the adapted engine stop delay time, thereby further adapting the second engine stop delay. In this example, the adapted second engine stop delay is decreased since there was a long engine idle time between vehicle speed reaching zero and stopping engine rotation. The adapted accelerator pedal gain is not adjusted since the actual engine speed closely matched the desired engine speed during engine run-up. Additionally, vehicle speed, engine speed, and accelerator pedal position are kept in states where engine stopping is not permitted in this example. The accelerator pedal is released and the brake pedal is applied as time approaches $T_{14}$.

At time $T_{14}$, vehicle speed reaches zero and the engine is once again at idle speed. The brake pedal remains applied by the driver and the accelerator pedal is not applied. The engine stop command is not asserted and the adapted second engine stop delay and accelerator pedal gains remain at constant values determined before time $T_{14}$. A timer is started in response to vehicle speed reaching zero and the timer continues to increase until the engine is to be restarted.

At time $T_{15}$, the engine stop command is asserted in response to the timer reaching a value of the adapted second engine stop delay. Notice that the time between time $T_{14}$ and time $T_{15}$ is shorter than the time between time $T_{11}$ and time $T_{12}$. The shorter time period is a result of reducing the adapted second engine stop delay. The supply of fuel and spark to the engine is ceased and engine rotation speed goes to zero. The vehicle speed remains at zero and the brake pedal continues to be applied. The adapted second engine stop delay and accelerator pedal gain remain at the same constant values since being adapted after time $T_{13}$.

At time $T_{16}$, the brake pedal is released by the driver and the engine is cranked over while being supplied with fuel and spark. The engine stop command is withdrawn and not asserted in response to the driver releasing the vehicle brake. The driver also applies the accelerator pedal shortly thereafter and engine speed increases. Engine speed follows a desired trajectory and torque is transferred from the engine to vehicle wheels via a transmission.

Between time $T_{16}$ and time $T_{17}$, the amount of time the engine is at idle between time $T_{11}$ and time $T_{12}$ is input to the cost function that weighs engine idle time with lost fuel economy. In this example, the adapted second engine stop delay is decreased again since there was a middle level of engine idle time between vehicle speed reaching zero and stopping engine rotation. The adapted accelerator pedal gain is not adjusted since the actual engine speed closely matched the desired engine speed during engine run-up. Additionally, vehicle speed, engine speed, and accelerator pedal position are kept in states where engine stopping is not permitted in this example.

At time $T_{17}$, vehicle speed reaches zero and the engine is at idle speed. The brake pedal remains applied by the driver and the accelerator pedal is not applied. The engine stop command is not asserted and the adapted second engine stop delay and accelerator pedal gains remain at constant values. A timer is started in response to vehicle speed reaching zero and the timer continues to increase until the engine is to be restarted.

At time $T_{18}$, the engine stop command is asserted in response to the timer reaching a value of the adapted second engine stop delay. The supply of fuel and spark to the engine is ceased and engine rotation speed goes to zero. The vehicle speed remains at zero and the brake pedal continues to be applied. The adapted second engine stop delay and accelerator pedal gain remain at the same constant values.

At time $T_{19}$, the brake pedal is released by the driver and the engine is cranked over while being supplied with fuel and spark. The engine stop command is withdrawn and not asserted in response to the driver releasing the vehicle brake. The driver also applies the accelerator pedal and engine speed increases. Engine speed follows a desired trajectory and torque is transferred from the engine to vehicle wheels via a transmission.

After time $T_{19}$ the amount of time the engine is at idle between times $T_{17}$ and time $T_{18}$ is again input to the cost function that weighs engine idle time with lost fuel economy. The adapted second engine stop delay is not decreased since there was a desirable engine idle time between vehicle speed reaching zero and stopping engine rotation. Likewise, the adapted accelerator pedal gain is not adjusted since the actual engine speed closely matched the desired engine speed during engine run-up.

Referring now to FIG. 5A, an example cost function that relates lost fuel economy to time since selected conditions are present to stop engine rotation is shown. The Y axis represents lost fuel economy (e.g., reduction in fuel efficiency) and lost fuel economy increases in the Y axis direction. The X axis represents an amount of time since selected conditions that allow stopping engine rotation are present. In one example, the selected engine conditions may include but are not limited to vehicle speed equal zero, no accelerator depression, and brake pedal applied. Curve 502 represents the relationship between time since conditions that allow stopping engine rotation and lost fuel economy. Thus, lost fuel economy increases with time since selected conditions are present that allow for stopping engine rotation.

The cost function of FIG. 5A is indexed via time since conditions are present for stopping engine rotation. The cost function then outputs a value that represents lost fuel economy. The value may be compared to a predetermined value, and if the value is larger than the predetermined value, the adapted engine stop delay may be decreased. On the other hand, if the engine stopping procedure is interrupted, the adapted engine stop delay may be increased a predetermined amount. In this way, the cost function is the basis for adjusting the engine stop delay time.

Referring now to FIG. 5B, two example cost functions are shown. The first cost function 504 relates driver annoyance to application of the accelerator pedal before engine restart is completed. The second cost function 506 relates driver annoyance to engine restarting being complete before accelerator application. The Y axis represents driver annoyance, which may be empirically determined, and driver annoyance increases in the Y axis direction. The X axis represents an amount of time since engine rotation has stopped.

The cost function 504 is indexed via time since engine rotation has stopped. The cost function then outputs a value that represents driver annoyance. The value may be compared to a predetermined value, and if the value is larger than the predetermined value, the adapted engine restart delay may be decreased. Cost function 506 may be indexed in a similar manner.

Referring now to FIG. 6, and example block diagram of an example system for stopping and starting a vehicle engine is shown. Engine stop/start scheduler 602 receives system inputs including but not limited to vehicle speed, engine speed, brake pedal position, accelerator pedal position, engine temperature, traffic conditions, and road conditions. Engine stop/start scheduler 602 judges whether or not conditions are present to automatically stop or start the engine. For example, engine stop/start scheduler 602 may decide to automatically stop engine rotation when vehicle speed is zero, the brake pedal is depressed, and when the accelerator pedal is not applied. Engine stop/start scheduler may decide to automatically start engine rotation when a brake pedal is released after the engine is automatically stopped. Engine stop/start scheduler 602 may decide when to stop or start the engine based on combinational logic or other known decision determining means.

Engine stop/start scheduler 602 also receives adapted engine stopping and starting criteria from adaptive tuning algorithm 606. Adapted engine stopping and starting criteria may be used within the combinational logic of engine stop/start scheduler 602 to judge whether or not to stop or start the engine. For example, adapted engine stopping criteria may include an engine stop delay time that is the basis for determining how long the engine should idle after other selected engine stopping conditions are met. If the engine has idled for a time equal to the engine stop delay time after other selected engine stopping conditions are met, engine rotation is stopped. In this way, the adaptive tuning algorithm works with the engine stop/start scheduler to determine when the engine should be stopped and started.

Engine stop and start commands are supplied by engine start/stop scheduler 602 to cost/utility functions 604. In some examples, the cost utility functions may be indexed via data from system inputs. Cost/utility functions 604 may include the functions described in FIGS. 5A and 5B as well as other cost functions. Cost/utility functions 604 provide output by which adaptive tuning algorithm adjusts engine stopping and starting criteria. Cost/utility function output may be multiplied or added to engine stopping and starting criteria within the adaptive tuning algorithm, or adaptive tuning algorithm may make predetermined adjustments to engine stopping and starting criteria based on a value output from the cost/utility function 604.

Figure 7:
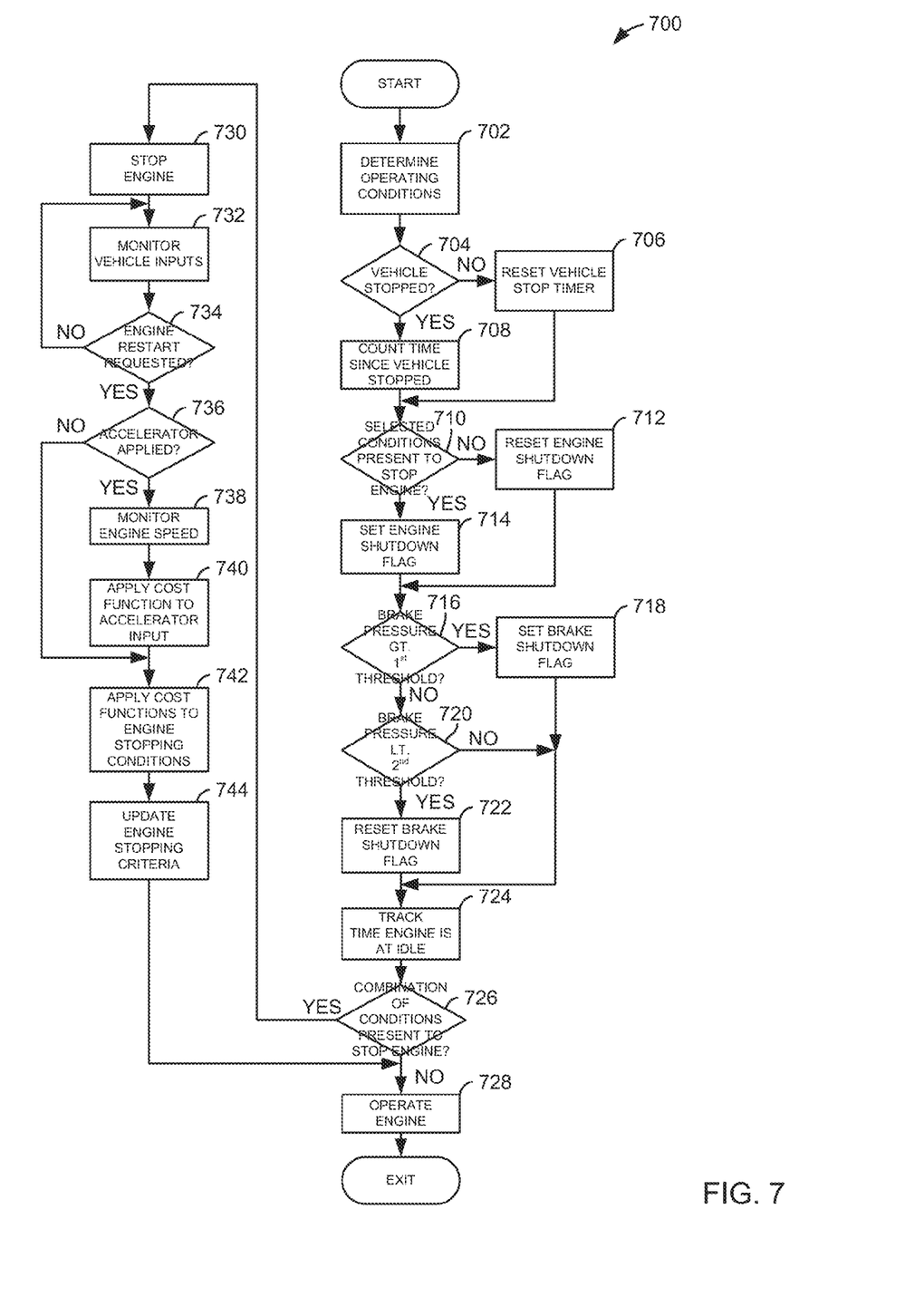
FIG. 7 is a flowchart of an example method for stopping and starting an engine.

Referring now to FIG. 7, method 700 is an example method for determining when to automatically stop and/or start an engine. Method 700 may be stored in non-transitory memory as executable instructions in the system of FIGS. 1 and 2. Method 700 may also provide the operating sequences illustrated in FIGS. 3 and 4.

At 702, method 700 determines vehicle operating conditions. Vehicle operating conditions may include but are not limited to engine speed, accelerator position, brake pedal position, vehicle speed, engine temperature, and driving surface conditions. Method 700 proceeds to 704 after vehicle operating conditions are determined.

At 704, method 700 judges whether or not the vehicle is stopped. A vehicle may be judged to be stopped when vehicle wheel speed is zero. In alternative examples, method 700 may judge whether or not the vehicle is decelerating. If method 700 judges that the vehicle is stopped, or alternatively if the vehicle is decelerating, the answer is yes and method 700 proceeds to 708. Otherwise, the answer is no and method 700 proceeds to 706.

At 706, method 700 resets a vehicle stop timer and/or a vehicle deceleration timer to zero. The vehicle stop timer measures an amount of time vehicle speed is zero. A vehicle deceleration timer measures an amount of time a vehicle speed is being reduced. By resetting the vehicle stop timer and/or vehicle deceleration timer, an accurate amount of time a vehicle is stopped and/or decelerating may be determined.

At 708, method 700 increments the vehicle stop timer and/or vehicle deceleration timer as time since vehicle stop and/or vehicle deceleration increases. In this way, the amount of time a vehicle is stopped and/or decelerating may be determined. Method 700 proceeds to 710 after the vehicle stop timer and/or vehicle deceleration timers are incremented.

At 710, method 700 judges whether selected conditions are present to stop the engine. The selected conditions may include but are not limited to engine speed, vehicle speed, brake pedal position, accelerator pedal position, engine temperature, and road conditions. Additionally, the selected conditions at which the engine may be stopped may vary as driving conditions vary. If the selected conditions for stopping the engine are present, the answer is yes and method 700 proceeds to 714. Otherwise, the answer is no and method 700 proceeds to 712.

At 712, method 700 resets the engine shutdown flag. The engine shutdown flag or variable is one input used to judge whether or not engine rotation should be stopped at 726. If the engine shutdown flag is cleared, engine rotation will not be automatically stopped. Method 700 proceeds to 716 after the engine shutdown flag is cleared.

At 714, method 700 sets or asserts the engine shutdown flag or variable. Engine rotation may be stopped at 730 when the engine shutdown flag is set. Method 700 proceeds to 716 after the engine shutdown flag is set.

At 716, method 700 judges whether or not vehicle brake pressure or brake pedal position is greater than a first threshold level. If so, the answer is yes and method 700 proceeds to 718. Otherwise, the answer is no and method 700 proceeds to 720.

At 718, method 700 sets or asserts a brake shutdown flag or variable. Engine rotation may be stopped at 730 when the brake shutdown flag is set. Method 700 proceeds to 724 after the brake shutdown variable is set.

At 720, method 700 judges whether or not vehicle brake pressure of brake pedal position is less than a second threshold level, the second threshold level less than the first threshold level. If so, the answer is yes and method 700 proceeds to 722. Otherwise, the answer is no and method 700 proceeds to 724.

At 722, method 700 resets or clears the brake shutdown flag. Thus, the brake shutdown flag may be reset when the brake pedal is released. Method 700 proceeds to 724 after the brake shutdown variable is cleared.

At 724, method 700 tracks an amount of time the engine is at idle speed. In one example, the amount of time an engine is at idle speed is measured via a timer, and the timer is reset to zero each time the engine is at a speed other than idle speed. The value in the timer increases as the time the engine idles increases. Method 700 proceeds to 726 after tracking engine idle time.

At 726, method 700 judges whether or not a combination of conditions are present to stop the engine. The combination of conditions is determined via assessing the states of the vehicle stop timer, the engine shutdown flag, and the brake shutdown flag. In other examples, additional or other conditions may be the basis for whether or not conditions are present to stop the engine. If method 700 judges conditions are present to stop the engine, the answer is yes and method 700 proceeds to 730. Otherwise, the answer is no the method proceeds to 728.

At 728, method 700 operates the engine. The engine operates via rotating the engine and supplying spark and fuel to the engine. Method 700 proceeds to exit after operating the engine.

At 730, method 700 stops the engine. The engine may be stopped via ceasing fuel flow and/or spark to the engine. Method 700 proceeds to 732 after the engine is stopped.

At 732, method 700 monitors vehicle inputs while the engine is stopped. The vehicle inputs may include brake pedal position, engine temperature, accelerator pedal position, and other conditions. Method 700 proceeds to 734 after monitoring vehicle conditions.

At 734, method 700 judges whether or not conditions are present to restart the engine automatically. An engine restart may be requested via releasing a brake pedal and/or applying an accelerator pedal as well as a change in state of other vehicle conditions. If method 700 judges that an automatic engine restart is requested, the answer is yes and method 700 proceeds to 736. Otherwise, the answer is no and method 700 returns to 732.

At 736, method 700 judges whether or not the accelerator pedal is applied. The accelerator pedal may be judged to be applied when the accelerator pedal position is non-zero from its base position. If method 700 judges that the accelerator is applied, the answer is yes and method 700 proceeds to 738. Otherwise, the answer is no and method 700 proceeds to 742.

At 738, method 700 monitors engine speed during a run-up period (e.g., a time from when engine speed is zero until the engine reaches idle speed a first time since engine stop). Further, engine speed may be monitored for a predetermined amount of time after engine speed reaches idle speed during an engine start. Monitoring engine speed may include comparing actual engine speed against a desired engine speed trajectory that is stored in controller memory. Further, the number of times actual engine speed exceeds or is less than desired engine speed as well as the amount of time actual engine speed is greater than or less than desired engine speed may be determined as well. Method 700 proceeds to 740 after monitoring engine speed.

At 740, engine speed is input to a cost function by method 700 to determine if the accelerator pedal position transfer function used during engine run-up should be adjusted. In some examples, two accelerator pedal position transfer functions may be applied during engine operation. The first is used during engine run-up and the second is used after engine run-up. The accelerator pedal position transfer function outputs a value based on the accelerator pedal position, and the value influences desired engine torque. If the driver inputs a large change in pedal position during engine run-up, vehicle launch may not be as smooth as is desired because of the driver input. The accelerator pedal cost function is a basis for determine if and how much an accelerator pedal position transfer function is updated. For example, if it is observed that engine speed is greater than a desired engine speed, it may be judged to reduce the accelerator pedal position transfer function output. Similarly, if it is observed that the driver applies and releases the accelerator pedal during engine run-up, it may be determined that the accelerator pedal position transfer function output is to be reduced to avoid the possibility of repeating such conditions. In one example, the accelerator pedal cost function outputs a variable to indicate whether or not to update the accelerator pedal transfer function. In other examples, the accelerator pedal transfer function may be multiplied by or added to the cost function output. Method 700 proceeds to 742 after adjustments may be applied to the accelerator pedal position transfer function.

At 742, method 700 applies cost functions to engine stopping conditions. For example, cost functions may be applied to engine idle time, time the engine is off, application of accelerator pedal, application of accelerator after engine start, and other conditions. Method 700 proceeds to 744 after engine stopping conditions are applied to cost functions.

At 744, method 700 updates engine stopping criteria in response to output of the cost functions. The stopping criteria may be updated by a predetermined amount or based on output from the cost functions at 742. Further, only portions of a transfer function or criteria that may take on more than one value may be adjusted based on the cost function output. For example, if the engine stop delay time varies depending on engine temperature, the value representing the delay time at present engine temperature may be adjusted while engine stop delay times for other temperatures may remain unchanged. Method 700 proceeds to 728 after engine stopping criteria have been updated.

Thus, the method of FIG. 7 provides for a method for operating an engine, comprising: automatically stopping an engine in response to one or more vehicle operating conditions meeting engine stopping criteria; and adjusting the engine stopping criteria in response to engine stopping conditions being evaluated via one or more cost functions. The method includes where the one or more cost functions include a cost function that weighs lost fuel economy against time since selected engine stopping criteria have been met. The method also includes where the one or more cost functions include a cost function that weighs driver accelerator pedal application between a time the engine is stopped and a time the engine reaches a threshold speed against an amount of time the engine is stopped. The method further includes where the threshold speed is idle speed.

In some examples, the method includes where the one or more cost functions include a cost function that weighs a first driver acceleration pedal application since engine stop and after the engine reaches a predetermined speed against an amount of time the engine is stopped. The method further comprises stopping the engine in response to the adjusted engine stopping criteria. The method further comprises allowing a driver to adjust the one or more cost functions via a driver input device.

In another example, the method of FIG. 7 provides for operating an engine, comprising: automatically stopping an engine in response to one or more vehicle operating condition meeting engine stopping criteria; adjusting the engine stopping criteria in response to engine stopping conditions being evaluated via one or more engine stopping cost functions; automatically restarting the engine; and adjusting a first actuator transfer function applied during engine run-up in response to engine starting conditions being evaluated via an engine starting cost function. The method includes where the first actuator transfer function is an accelerator pedal transfer function.

The method of FIG. 7 further comprises applying a second actuator transfer function in place of the first actuator transfer function after engine run-up. The method includes where adjusting the first actuator transfer function includes reducing a gain of the first actuator transfer function in response to engine speed exceeding a threshold speed trajectory during engine run-up. The method includes where adjusting the first actuator transfer function includes increasing a gain of the first actuator transfer function in response to engine speed being less than a threshold speed trajectory during engine run-up. The method also includes where the engine starting cost function weighs a torque against driver annoyance. The method also includes where the torque is a wheel torque or an engine torque. The method further includes where the engine starting cost function weighs engine speed deviation from a desired engine speed against driver annoyance.

As will be appreciated by one of ordinary skill in the art, routine described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method for operating an engine of a vehicle, comprising:
   automatically stopping an engine in response to one or more vehicle operating conditions meeting engine stopping criteria; and
   adjusting the engine stopping criteria in response to engine stopping conditions being evaluated via one or more cost functions, including increasing an engine idle time after a vehicle stop if a driver exhibits a characteristic of releasing vehicle brakes after stopping to allow the vehicle to creep.

2. The method of claim 1, where the one or more cost functions include a cost function that weighs lost fuel economy against time since selected engine stopping criteria have been met.

3. The method of claim 1, where the one or more cost functions include a cost function that weighs driver accelerator pedal application between a time the engine is stopped and a time the engine reaches a threshold speed against an amount of time the engine is stopped.

4. The method of claim 3, where the threshold speed is idle speed.

5. The method of claim 1, where the one or more cost functions include a cost function that weighs a first driver acceleration pedal application since engine stop and after the engine reaches a predetermined speed against an amount of time the engine is stopped.

6. The method of claim 1, further comprising stopping the engine in response to the adjusted engine stopping criteria and allowing a driver to adjust the one or more cost functions via a driver input device.

7. The method of claim 1, wherein the adjusting further includes, as an alternative to increasing engine idle time, stopping the engine just when the vehicle stops if the driver routinely waits several minutes before requesting vehicle acceleration after vehicle stop.

8. A method for operating an engine, comprising:
   automatically stopping an engine in response to one or more vehicle operating conditions meeting engine stopping criteria;
   adjusting the engine stopping criteria in response to engine stopping conditions being evaluated via one or more engine stopping cost functions;
   automatically restarting the engine; and
   adjusting a gain of a first actuator transfer function applied during engine run-up in response to engine starting conditions being evaluated via an engine starting cost function, the engine starting conditions including engine speed during engine run-up.

9. The method of claim 8, where the first actuator transfer function is an accelerator pedal transfer function.

10. The method of claim 8, further comprising applying a second actuator transfer function in place of the first actuator transfer function after engine run-up.

11. The method of claim 8, where adjusting the gain of the first actuator transfer function includes reducing a gain of the first actuator transfer function in response to engine speed exceeding a threshold speed trajectory during engine run-up.

12. The method of claim 8, where adjusting the gain of the first actuator transfer function includes increasing a gain of the first actuator transfer function in response to engine speed being less than a threshold speed trajectory during engine run-up.

13. The method of claim 8, where the engine starting cost function weighs a torque against driver annoyance.

14. The method of claim 13, where the torque is a wheel torque or an engine torque.

15. The method of claim 8, where the engine starting cost function weighs engine speed deviation from a desired engine speed against driver annoyance.

16. A system for operating an engine, comprising:
an engine; and
a controller including non-transitory instructions to automatically stop the engine in response to one or more vehicle operating conditions meeting engine stopping criteria, instructions for adjusting the engine stopping criteria in response to a value output by one or more cost functions including an empirically-determined cost function that outputs a value representing a driver annoyance level, and instructions to adjust the one or more cost functions.

17. The system of claim 16, where the one or more cost functions are adjusted in response to driver input.

18. The system of claim 16, further comprising a driver input device for adjusting the one or more cost functions.

19. The system of claim 16, further comprising additional instructions for adjusting an actuator transfer function applied during engine run-up.

20. The system of claim 16, where the one or more cost functions weigh time an engine is stopped against driver annoyance.

* * * * *